No. 707,384. Patented Aug. 19, 1902.
W. L. BURNER.
HOMINY, MEAL, AND GRITS DRIER.
(Application filed May 24, 1901.)
(No Model.) 2 Sheets—Sheet 1.
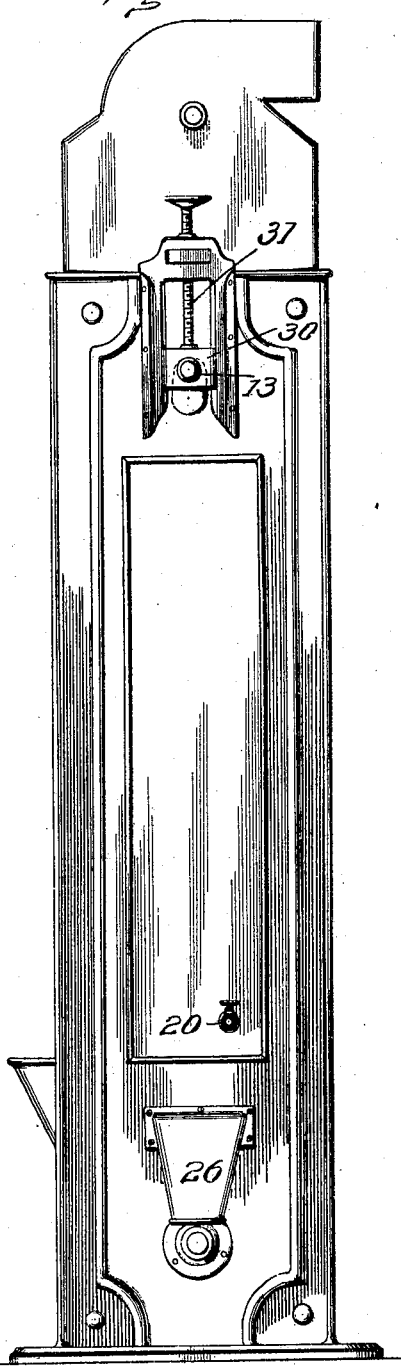
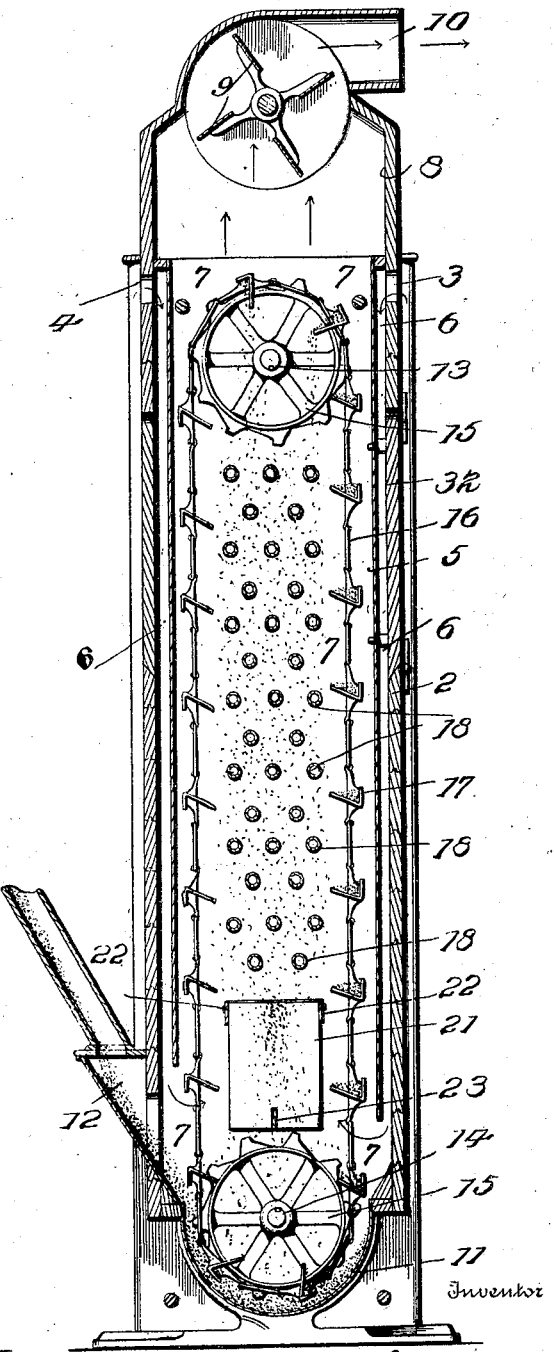

No. 707,384. Patented Aug. 19, 1902.
W. L. BURNER.
HOMINY, MEAL, AND GRITS DRIER.
(Application filed May 24, 1901.)
(No Model.) 2 Sheets—Sheet 2.
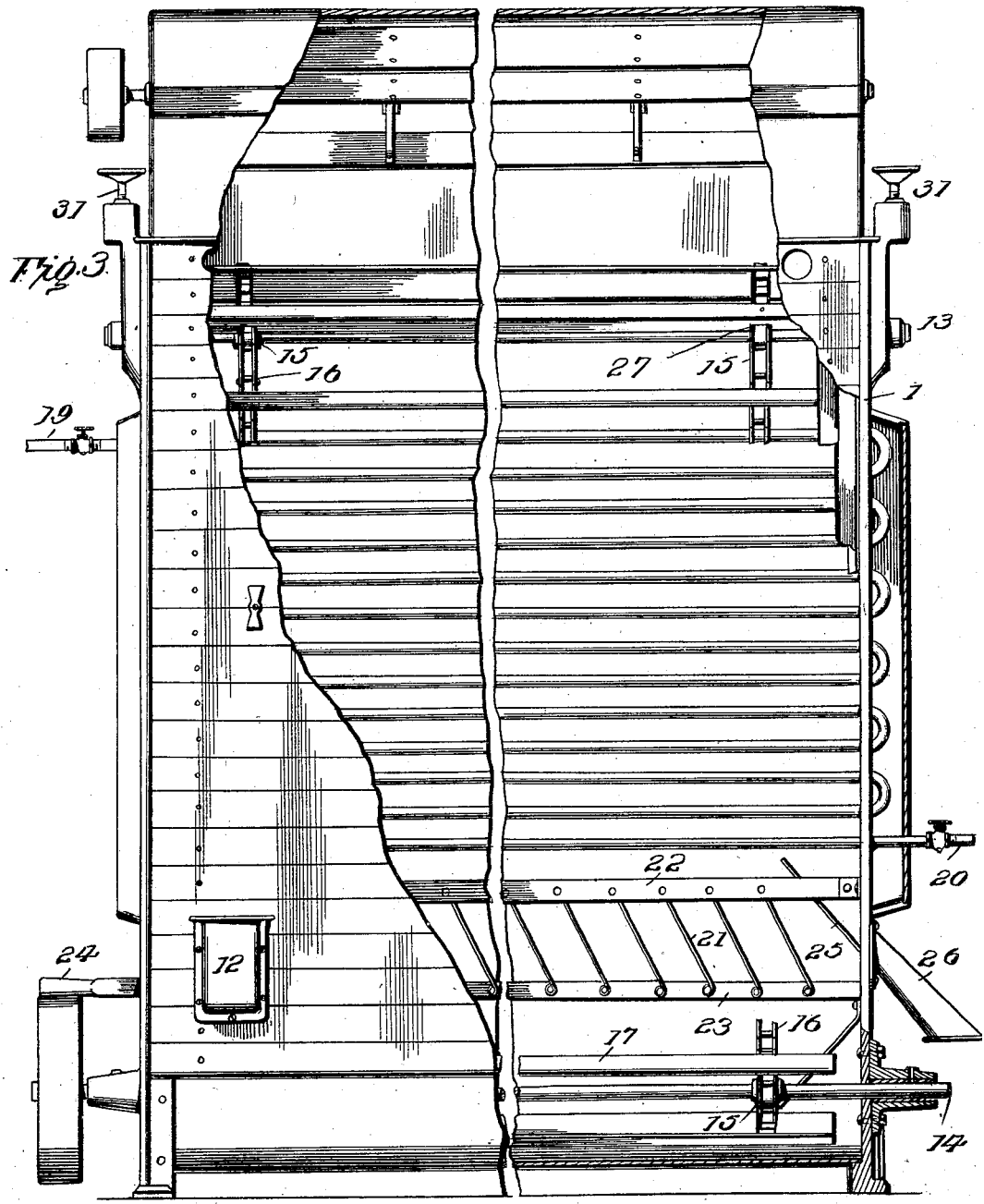

UNITED STATES PATENT OFFICE.

WILLIAM L. BURNER, OF COLUMBUS, OHIO, ASSIGNOR TO THE CASE MANUFACTURING COMPANY, OF COLUMBUS, OHIO, A CORPORATION OF OHIO.

HOMINY, MEAL, AND GRITS DRIER.

SPECIFICATION forming part of Letters Patent No. 707,384, dated August 19, 1902.

Application filed May 24, 1901. Serial No. 61,734. (No model.)

*To all whom it may concern:*

Be it known that I, WILLIAM L. BURNER, a citizen of the United States, and a resident of Columbus, county of Franklin, State of Ohio, have invented certain new and useful Improvements in Hominy, Meal, and Grits Driers, of which the following is a specification.

My invention relates to an apparatus into which any of the products referred to may be introduced and by which they will be thoroughly dried during their passage through the machine. In the successful drying of these products it is necessary that they be kept above a certain temperature in order that the moisture may pass off freely, and it is also essential that the current of air employed for evaporating the moisture from the material shall be warm, so that it will not chill the material and condense the moisture which the air is to take up and bear away out of the machine.

My invention has for its object to provide a simple, cheap, and effective machine in the operation of which the material to be dried is introduced at one end of the machine, repeatedly taken up from the bottom and discharged at the top of the machine and permitted to gravitate in a thin stream over heating-surfaces and through an opposing current of air, and by its successive gravitations caused to advance at a rate readily through the machine, and finally pass into a tailing-spout.

My invention consists in certain novel combinations of features whereby the foregoing objects are attained, as will hereinafter be fully described, and particularly pointed out in the claims, reference being had to the accompanying drawings, forming part of this specification.

Figure 1 is an end elevation of a grain-drier in which my improvements are embodied. Fig. 2 is a vertical transverse section of the same. Fig. 3 is a front view, partly in section; and Fig. 4 is a detail view illustrating a portion of the elevator.

1 represents a casing the side walls of which, as shown in Fig. 2, are made up of an outer shell 2, of wood, having openings 3 4 for the ingress of air, and an inner shell 5, of metal, spaced apart from the outer shell 2, so as to leave air-passages 6, and terminating near the bottom of the machine, so as to bring the air-passages 6 into communication with the drying-chamber 7 within the machine.

The machine is surmounted by a hood 8, containing a fan 9, that discharges air through the outlet 10, thus setting up a circulation in through the openings 3 4, down through passages 6, and up through the drying-chamber 7. As the drying-chamber is provided with means, to be hereinafter described, for heating the material as it gravitates through the chamber 7, the metallic walls 5 will be kept warm, and consequently the air entering the drying-chamber through the passages 6 will be heated sufficiently to prevent condensation of the moisture on the material coming in contact with the air.

The drier is provided with a trough-bottom 11 and at one end thereof a feed-spout 12, through which material is introduced to the machine. Shafts 13 14 extend longitudinally through the machine at the top and bottom thereof, respectively, and carry at their opposite ends sprocket-wheels 15, around which pass chains 16, carrying elevator-buckets 17, that extend from end to end of the machine. The buckets 17 pass into the trough 11 and scoop up the material found therein, carrying it up over the upper shaft 13 and gradually dumping it during the passages of the buckets between points at the ends of the horizontal and vertical diameters of the upper wheel 15, by which action the material is distributed in a light stream and its gravitation back to the trough at the bottom permitted, where it is again picked up by the buckets and the action repeated.

Extending longitudinally through the machine are heating-pipes 18, which are connected together in an endless coil adapted to receive steam or other heating medium from a pipe 19, Fig. 3, and discharge it or the water from its condensation through a pipe 20, so that the pipes 18 are kept hot at all times during the operation of the machine. Pipes 18 are staggered in position, so that the material does not find a straight passage through the group of pipes, but drops upon and rebounds from one to another, thus retarding its gravitation and insuring the heating effect of the pipes upon the material.

From the foregoing description it will be plain that the material introduced from the spout 12 is elevated repeatedly and permitted to gravitate over, around, or among a series of heating-pipes, by which the temperature of the material is raised and its contained moisture evaporated, while a current of warm air passes upward through the body of scattered gravitating material, takes up the moisture therefrom, and carries it off through the outlet 10. To cause the material to feed through the machine and gradually emerge from the end opposite to that at which it enters, the drying-chamber 7 is provided with a longitudinal series of cant-boards 21, each of which is pivoted at its upper end between a pair of longitudinal bars 22 and has secured to its lower end a shifting-bar 23, which extends longitudinally through the machine, as shown more clearly in Fig. 3, and terminates in a controlling-handle 24. As the material drops through the group of pipes it strikes upon the cant-boards 21 and is deflected slightly toward the tail end of the machine. The rapidity with which the material passes through the machine, and consequently the number of times it must be elevated and subjected to the drying action before escaping from the machine, depends upon the angle of the cant-boards 21. This angle may be fixed at will by moving the bar 23 through means of its handle 24. All that portion of the material which has been advanced by the cant-boards until it is taken up by the right-hand end of the elevator-buckets, as viewed in Fig. 3, will fall upon an incline 25, (shown in said figure,) which directs it to a tailing-spout 26.

Each elevator-bucket 17 comprises an angle-bar, as shown in Fig. 4, slotted at 27 to receive the chain 16 and having its back 28 riveted to solid links 29, interposed at suitable intervals in the chain 16.

30, Fig. 1, represents one of two bearing-blocks which provide bearings for the ends of the shaft 13 and may be adjusted by screws 31, Figs. 1 and 3, to regulate the tension on the chains 16.

32 represents removable panels in the outer walls 2, to which are secured, by means which will not obstruct the air-passage 6, corresponding portions of the inner shell 5, so that these parts may be removed to permit inspection of the working of the machine.

I do not limit myself to the use of a hood on the top of the machine or a fan in said hood, inasmuch as the heating-pipes within the drying-chamber will naturally cause an upward current of warm air, which will produce a downward current in the passages 6, and thus in a measure and for some purposes amply secure the circulation of air through the machine.

Having thus described my invention, the following is what I claim as new therein and desire to secure by Letters Patent:

1. In a grain-drier, the combination of the outer shell having air-inlet openings, a depending shell within and spaced apart from the outer shell and forming air-passages on two sides of the machine, said inner shell so constructed as to permit said passages to communicate at their lower ends with the drying-chamber for heating the grain, said shells forming a casing for said drying-chamber, and means for dropping the grain in the upper portion of the drying-chamber to permit it to gravitate therein, substantially as set forth.

2. In a grain-drier, the combination of the outer shell 2 having openings 3 and 4, the inner metallic shell 5 forming with said outer shell air-passages and terminating short of the bottom of the machine to bring the passages into communication with the drying-chamber 7, said shells forming a casing for said drying-chamber, means for elevating and dropping material within the drying-chamber, the heating-pipes 18 within the drying-chamber, and means for delivering and discharging material from the machine.

3. In a grain-drier, the combination of the outer shell having air-inlet openings, a depending shell within and spaced apart from the outer shell and forming air-passages on two sides of the machine, said inner shell so constructed as to permit said passages to communicate at their lower ends with the drying-chamber for heating the grain, said shells forming a casing for said drying-chamber, of shafts extending longitudinally through said drying-chamber and carrying sprocket-wheels, chains traveling on the sprocket-wheels, elevator-buckets extending the length of the drying-chamber and mounted on said chains, and a coil of heating-pipes for drying material as it gravitates from the point of discharge of the elevator-buckets, substantially as set forth.

4. In a grain-drier, the combination of the outer shell having air-inlet openings, a depending shell within and spaced apart from the outer shell and forming air-passages on two sides of the machine, said inner shell so constructed as to permit said passages to communicate at their lower ends with the drying-chamber for heating the grain, said shells forming a casing for said drying-chamber, of shafts extending longitudinally through the drying-chamber and carrying sprocket-wheels, chains mounted upon the sprocket-wheels, elevator-buckets extending the length of the machine mounted upon the chains and a coil of heating-pipes extending longitudinally the machine in the path of the gravitating material which is elevated and discharged by the buckets, substantially as set forth.

5. In a grain-drier, the combination of the outer shell having air-inlet openings, a depending shell within and spaced apart therefrom and forming air-passages on two sides of the machine, said inner shell so constructed as to permit said passages to communicate at their lower ends with the drying-chamber for heating the grain, said shells forming the drying-chamber, sprocket-wheels suitably mounted to rotate in the upper and lower portions of said drying-chamber, chains traveling upon the sprocket-wheels, elevator-buckets mounted upon the chains elevating the material from the bottom of the machine and dropping it at the top, so that it is permitted to gravitate through the drying-chamber, a coil of heating-pipes for drying the grain as it gravitates, and a series of cant-boards by which the material is caused to progress through the machine as it repeatedly gravitates, for the purpose set forth.

6. In a grain-drier, the combination of the outer shell having air-inlet openings, a depending shell within and spaced apart therefrom and forming air-passages on two sides of the machine, said inner shell so constructed as to permit said passages to communicate at their lower ends with the drying-chamber for heating the grain, said shells forming the drying-chamber, elevator-buckets suitably mounted within the drying-chamber and extending the length thereof, a coil of heating-pipes grouped in the path of gravitating material which is elevated and discharged by the buckets, cant-boards located beneath the group of heating-pipes, an inlet-spout at one end of the machine and a tailing-spout at the other end of the machine.

7. In a drier, the combination of the casing formed of an outer non-conducting or wooden shell 2, and an inner metallic heat-conducting shell 5 forming with the outer shell a passage 6, which communicates at its upper end with the outer atmosphere, and at its lower end with the drying-chamber of the machine, said shells forming a casing for said drying-chamber, a hood 8 provided with a fan 9 above the machine for setting up a circulation of air downward through the passage 6 and upward through the drying-chamber, the endless-chain elevator having buckets extending the length of the drying-chamber continually raising and dropping material therein, the group of longitudinal heating-pipes extending through the drying-chamber grouped in the path of the gravitating material discharged by the elevator-buckets, the intake-spout at one end of the machine, the tailing-spout at the other end of the machine, a series of cant-boards 21 located in the path of the gravitating material, an incline 25 at the tailing end of the machine and directing material to the tailing-outlet, substantially as set forth.

8. In a grain-drier, the combination of a suitable drying-chamber and means for elevating and precipitating grain into said drying-chamber, said means comprising suitably-arranged sprocket-wheels, chains carried by said wheels, said chains having solid links interposed at suitable intervals therein and buckets carried by said chains comprising slotted angle-bars, said slots adapted to receive said chains whereby said buckets are capable of being riveted to said solid links.

WILLIAM L. BURNER.

Witnesses:
C. E. BRIGHT,
G. W. BROWN.